(12) United States Patent
Osako et al.

(10) Patent No.: US 11,080,494 B2
(45) Date of Patent: Aug. 3, 2021

(54) RECORDING TAPE CARTRIDGE, BARCODE PRINTING SYSTEM, BARCODE PRINTING METHOD, AND METHOD OF MANUFACTURING RECORDING TAPE CARTRIDGE WITH BARCODE

(71) Applicant: FUJIFILM CORPORATION, Tokyo (JP)

(72) Inventors: Ryosuke Osako, Kanagawa (JP); Yosuke Sumiya, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/790,757

(22) Filed: Feb. 14, 2020

(65) Prior Publication Data

US 2020/0311355 A1 Oct. 1, 2020

(30) Foreign Application Priority Data

Mar. 25, 2019 (JP) .............................. JP2019-056192

(51) Int. Cl.
*G06K 1/12* (2006.01)
*G06K 19/06* (2006.01)
*G11B 33/04* (2006.01)

(52) U.S. Cl.
CPC ....... *G06K 1/121* (2013.01); *G06K 19/06028* (2013.01); *G06K 19/06037* (2013.01); *G11B 33/04* (2013.01)

(58) Field of Classification Search
CPC ...................................................... G06K 1/121
USPC ....................................................... 358/1.15
See application file for complete search history.

(56) References Cited

U.S. PATENT DOCUMENTS

| | | | | |
|---|---|---|---|---|
| 4,657,419 A | * | 4/1987 | Takakuwa | B29C 43/18 264/132 |
| 2002/0197090 A1 | * | 12/2002 | Akaiwa | B41J 3/4075 400/76 |
| 2009/0242680 A1 | * | 10/2009 | Onmori | G11B 23/08714 242/348 |
| 2009/0242681 A1 | * | 10/2009 | Sumiya | G11B 23/107 242/348 |
| 2013/0175380 A1 | * | 7/2013 | Sato | G11B 15/32 242/340 |
| 2018/0232619 A1 | * | 8/2018 | Kagawa | G06K 19/06028 |

(Continued)

FOREIGN PATENT DOCUMENTS

| | | |
|---|---|---|
| JP | 2010-049727 A | 3/2010 |
| JP | 2018-129103 A | 8/2018 |

*Primary Examiner* — Jacky X Zheng
(74) *Attorney, Agent, or Firm* — Solaris Intellectual Property Group, PLLC

(57) ABSTRACT

A recording tape cartridge includes a case that is formed by a first half in which a first peripheral wall is erected around a top plate and a second half in which a second peripheral wall is erected around a bottom plate being joined to each other in a state where the first peripheral wall and the second peripheral wall are butted against each other and that stores a reel on which the recording tape is wound; and a label surface formed by a first half label surface of the first peripheral wall and a second half label surface of the second peripheral wall on a side opposite to a loading direction of the case to a drive device, and a one-dimensional barcode on which individual identification information is recorded is printed only on the second half label surface.

14 Claims, 8 Drawing Sheets

(56) References Cited

U.S. PATENT DOCUMENTS

2019/0004756 A1\* 1/2019 Kajihara ............... G06F 3/1256
2020/0104665 A1\* 4/2020 Kagawa ............. G06K 7/10544

\* cited by examiner

RECORDING TAPE CARTRIDGE, BARCODE PRINTING SYSTEM, BARCODE PRINTING METHOD, AND METHOD OF MANUFACTURING RECORDING TAPE CARTRIDGE WITH BARCODE

CROSS-REFERENCE TO RELATED APPLICATION

This application claims priority under 35 USC 119 from Japanese Patent Application No. 2019-056192 filed Mar. 25, 2019, the disclosure of which is incorporated by reference herein.

BACKGROUND

Technical Field

The present disclosure relates to a recording tape cartridge, a barcode printing system, a barcode printing method, and a method of manufacturing a recording tape cartridge with a barcode.

Related Art

There is a case where a plurality of recording tape cartridges to be used as external recording media of a computer or the like are stored and kept in a storage referred to as a library. In a case where a desired recording tape cartridge is loaded into a drive device, the recording tape cartridge has a rear part gripped by a robot hand provided in the library and thereby, is taken out from the library and loaded into the drive device.

Meanwhile, an individual recording tape cartridge stored in the library is individually identified by a barcode of a barcode label attached to a label surface formed at a rear wall of a case. That is, in the library, in a case where the robot hand grips the rear part of the recording tape cartridge, the barcode of the barcode label attached to the label surface is read by the barcode reader provided on the robot hand.

As the barcode label, a barcode label capable of writing a memo has been known from the past (for example, refer to JP2010-049727A). However, since such a barcode label for individual identification is manually attached to the label surface of the case after the barcode is printed, there is a drawback that the manual attachment work is troublesome.

Meanwhile, it has been previously proposed that a barcode may be formed (printed) on the label surface of the case using a laser, ink, or the like (refer to, for example, JP2018-129103). However, the case of the recording tape cartridge is configured by joining a peripheral wall of an upper half and a peripheral wall of a lower half to each other in a butted state. Therefore, in a case where the barcode is printed beyond a parting line, there is a concern that poor reading of the barcode occurs such that a plurality of lines that constitutes the barcode may be cut or shifted in the middle.

SUMMARY

Thus, an object of the present disclosure is to provide a recording tape cartridge, a barcode printing system, a barcode printing method, and a method of manufacturing a recording tape cartridge with a barcode capable of suppressing the occurrence of poor reading with respect to a barcode even if the barcode is printed on a label surface of a case.

In order to achieve the above object, a recording tape cartridge according to the present disclosure comprises a case that is formed by a first half in which a first peripheral wall is erected around a top plate and a second half in which a second peripheral wall is erected around a bottom plate being joined to each other in a state where the first peripheral wall and the second peripheral wall are butted against each other and that stores a reel on which the recording tape is wound; and a label surface formed by a first half label surface of the first peripheral wall and a second half label surface of the second peripheral wall on a side opposite to a loading direction of the case to a drive device, and a one-dimensional or two-dimensional barcode on which individual identification information is recorded is printed only on the first half label surface or the second half label surface.

Additionally, a barcode printing system according to the present disclosure comprises a conveying unit that conveys a recording tape cartridge including a case that is formed by a first half in which a first peripheral wall is erected around a top plate and a second half in which a second peripheral wall is erected around a bottom plate being joined to each other in a state where the first peripheral wall and the second peripheral wall are butted against each other and that stores a reel on which the recording tape is wound, and a label surface formed by a first half label surface of the first peripheral wall and a second half label surface of the second peripheral wall on a side opposite to a loading direction of the case to a drive device; and a printing unit that prints a one-dimensional or two-dimensional barcode in which individual identification information is recorded only on the first half label surface or the second half label surface of the recording tape cartridge conveyed by the conveying unit.

Additionally, a barcode printing method according to the present disclosure comprises a base printing step of printing a white base on at least one of a first half label surface or a second half label surface, in a recording tape cartridge that includes a case that is formed by a first half in which a first peripheral wall is erected around a top plate and a second half in which a second peripheral wall is erected around a bottom plate being joined to each other in a state where the first peripheral wall and the second peripheral wall are butted against each other and that stores a reel on which the recording tape is wound, and a label surface formed by the first half label surface of the first peripheral wall and the second half label surface of the second peripheral wall on a side opposite to a loading direction of the case to a drive device, and that is conveyed by a conveying unit; and a barcode printing step of printing a one-dimensional or two-dimensional barcode in which individual identification information is recorded only on the base printed on the first half label surface or the base printed on the second half label surface.

Additionally, in a method of manufacturing a recording tape cartridge with a barcode according to the present disclosure, a one-dimensional or two-dimensional barcode is printed on a recording tape cartridge by the above barcode printing method.

According to the present disclosure, it is possible to suppress the occurrence of poor reading with respect to the barcode even if the barcode is printed on the label surface of the case.

BRIEF DESCRIPTION OF THE DRAWINGS

Exemplary Embodiments of the present disclosure will be described in detail with reference to the following figures, wherein.

DETAILED DESCRIPTION

Hereinafter, embodiments according to the present disclosure will be described in detail with reference to the drawings. In addition, for convenience of description, in FIG. 1, a loading direction of a recording tape cartridge 10 into a drive device is indicated by arrow A, and is referred to as a forward direction (front side) of the recording tape cartridge 10. Also, a direction of arrow B orthogonal to the arrow A is referred to as a rightward direction (right side), and a direction of arrow C orthogonal to the arrow A and the arrow B is referred to as an upward direction (upper side).

Figure 1:
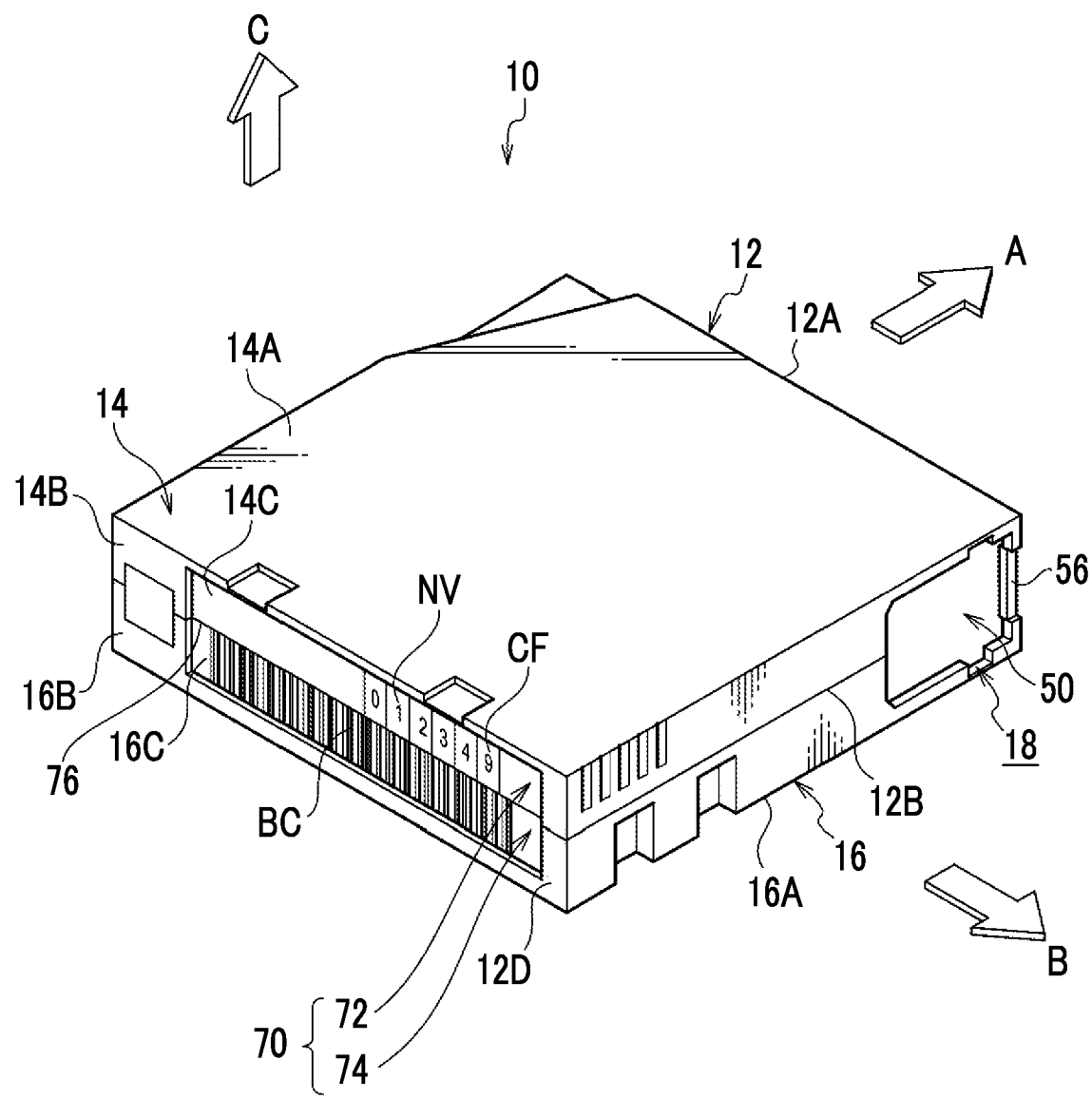
FIG. 1 is a perspective view illustrating a recording tape cartridge according to the present embodiment as viewed from the rear.
Figure 2:
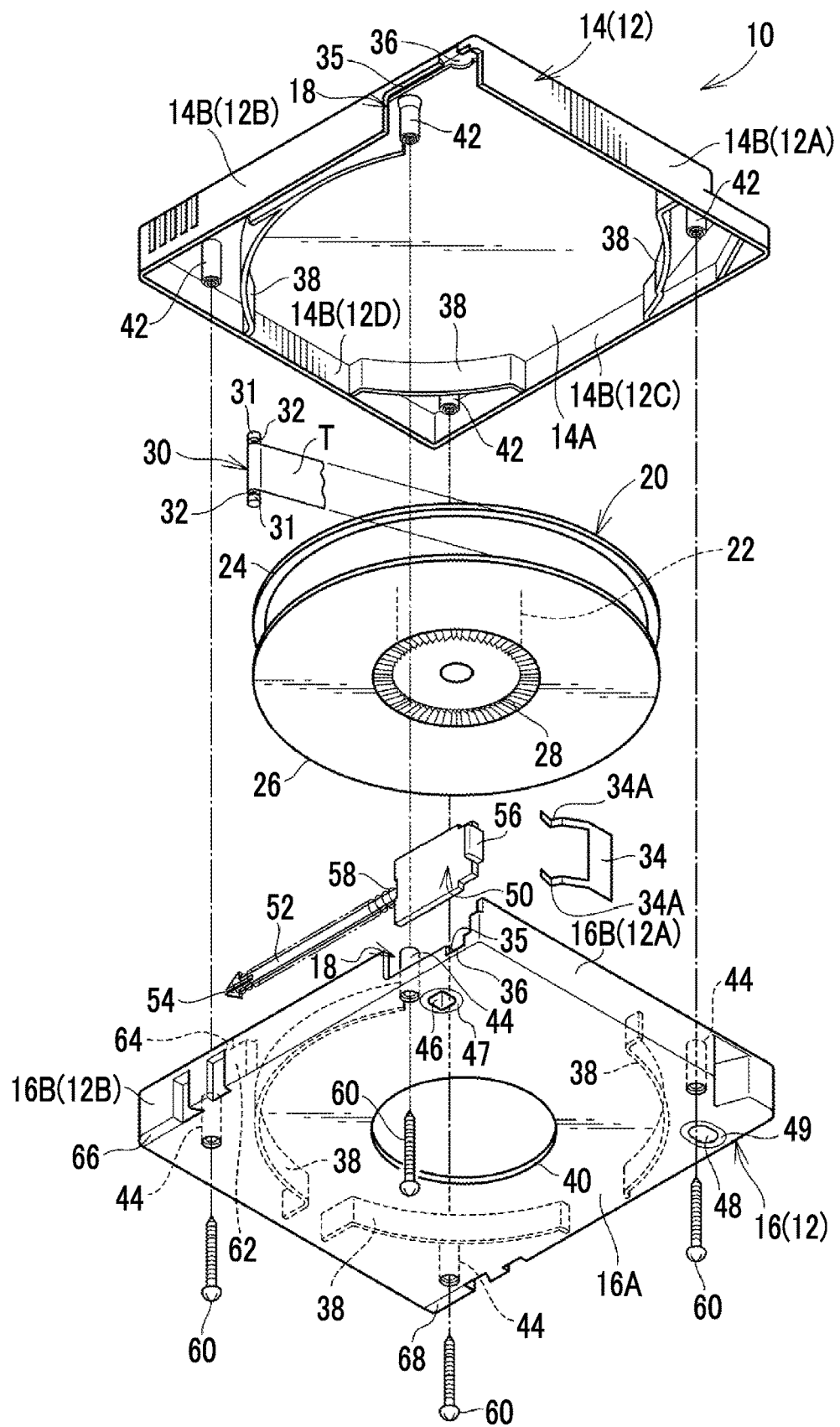
FIG. 2 is an exploded perspective view illustrating the recording tape cartridge according to the present embodiment as viewed from below.

First, the entire configuration of the recording tape cartridge 10 will be simply described. As illustrated in FIGS. 1 and 2, the recording tape cartridge 10 has a substantially rectangular box-shaped case 12. That is, the case 12 is constituted of a first half 14 that has a substantially rectangular top plate 14A and a first peripheral wall 14B erected from a peripheral edge of the top plate 14A, and a second half 16 that has a substantially rectangular bottom plate 16A and a second peripheral wall 16B erected from a peripheral edge of the bottom plate 16A. In addition, the case 12 is made of resin, such as polycarbonate (PC).

Additionally, as illustrated in FIG. 2, in the first half 14, a plurality of (for example, four) screw bosses 42, which serve as non-through holes and are threaded at inner peripheral surfaces thereof, are formed in the vicinity of respective corners of the first half 14. Also, in the second half 16, a plurality (for example, four) screw bosses 44 that serve as through holes are formed at positions corresponding to the respective screw bosses 42, that is, in the vicinity of respective corners of the second half 16 in a case where the first half 14 and the second half 16 are superimposed on each other (in a case where a lower end surface of the first peripheral wall 14B and an upper end surface of the second peripheral wall 16B are butted against each other).

In a case where the case 12 is assembled, the lower end surface of the first peripheral wall 14B and the upper end surface of the second peripheral wall 16B are butted against each other. However, in this case, a lower end surface of each screw boss 42 and an upper end surface of each screw boss 44 are butted against each other. Then, in this state, as screws 60 are inserted into the screw bosses 44 from the bottom plate 16A side and threadedly engaged with the screw bosses 42, the first half 14 and the second half 16 are joined to each other. In addition, means for joining the first half 14 and the second half 16 to each other is not limited to the screws 60, and may be joined to each other by, for example, ultrasonic welding.

Only one reel 20 made of resin is rotatably stored inside the case 12. The reel 20 is constituted of a bottomed cylindrical reel hub 22, and a disk-shaped upper flange 24 and a disk-shaped lower flange 26 that are respectively provided at both ends of the reel hub 22 in the axial direction. A recording tape T, such as a magnetic tape as an information recording and reproducing medium, is wound around an outer peripheral surface of the reel hub 22, and both ends thereof in a width direction are position-regulated by the upper flange 24 and the lower flange 26, respectively.

Additionally, as illustrated in FIGS. 1 and 2, an opening 18 for pulling out the recording tape T wound around the reel 20 is formed in the right wall 12B of the case 12. Also, as illustrated in FIG. 2, a substantially columnar leader pin 30, which is pulled out and operated by a pull-out member (not illustrated) of the drive device (not illustrated), is attached to a free end of the recording tape T pulled out from the opening 18.

Annular grooves 32 are respectively formed on axially inner sides at both ends 31 of the leader pin 30 protruding axially outward beyond both ends of the recording tape T in the width direction, and each annular groove 32 is locked to a hook or the like of the pull-out member. Accordingly, in a case where the pull-out member pulls out the recording tape T, there is no case where the hook or the like thereof comes into contact with the recording tape T and the recording tape T is damaged.

Additionally, a pair of upper and lower pin holding parts 36 that positions and holds the leader pin 30 within the case 12 are formed inside the opening 18 of the case 12, that is, in an inner surface of the top plate 14A of the first half 14, and the inner surface of the bottom plate 16A of the second half 16. The pin holding parts 36 each have a substantially semicircular shape in a plan view in which a pull-out side of the recording tape T is open, and the both ends 31 of the leader pin 30 in an erected state are capable of entering and leaving the pin holding parts 36 from the opening side.

Additionally, a leaf spring 34 is fixedly disposed in the vicinity of the pin holding parts 36. Bifurcated distal ends 34A of the leaf spring 34 hold down both ends 31 of the leader pin 30, respectively, so as to hold the leader pin 30 in the pin holding parts 36. In addition, in a case where the leader pin 30 enters and leaves the pin holding parts 36, the distal ends 34A of the leaf spring 34 are appropriately elastically deformed so as to allow movement of the leader pin 30.

Additionally, a gear opening 40 for exposing a reel gear 28 of the reel 20 to the outside is formed at a central part of the second half 16 (bottom plate 16A). The reel 20 is rotationally driven within the case 12 as the reel gear 28 meshes with a drive gear (not illustrated) of the drive device. Additionally, the reel 20 is provided on inner surfaces of the first half 14 and the second half 16, respectively, so as to partially protrude therefrom, and is position-regulated so as not to rattle by a play regulating wall 38 on a circular track coaxial with the gear opening 40.

Additionally, as illustrated in FIGS. 1 and 2, the opening 18 is opened and closed by a door 50. The door 50 is formed in a rectangular plate shape of a size such that the opening 18 can be blocked, and grooves 35, which allow upper and lower ends of the door 50 to slidably fit thereinto, are formed in the inner surface of the top plate 14A and the inner surface of the bottom plate 16A inside the opening 18 so as to movable along the right wall 12B of the case 12.

Additionally, a shaft 52 is provided at the center of a rear end of the door 50 so as to protrude therefrom, and a coil spring 58 is fitted on the shaft 52. Also, an expanding part 54, which prevents the coil spring 58 from slipping out of the shaft 52, is formed at a rear end of the shaft 52. Additionally, a supporting base 62, which has a locking projection 64 to which a rear end of the coil spring 58 fitted on the shaft 52 is locked, is provided in the second half 16 so as to protrude therefrom.

Hence, the door 50 is always biased due to the biasing force of the coil spring 58 in a blocking direction of the opening 18 as the shaft 52 is slidably supported on the supporting base 62, and the rear end of the coil spring 58 is locked to the locking projection 64. In addition, it is preferable that a supporting base (not illustrated) that supports the shaft 52 during the opening of the opening 18 is further provided on a rear side of the supporting base 62 so as to protrude therefrom.

Additionally, a protrusion 56 for opening and closing operation is provided at a front end of the door 50 as to protrude toward the outside (right). The protrusion 56 is engaged with an opening and closing member (not illustrated) of the drive device with the loading of the recording tape cartridge 10 from a front wall 12A side to the drive device. Accordingly, the door 50 is opened against the biasing force of the coil spring 58.

Additionally, as illustrated in FIG. 2, in the bottom plate 16A of the second half 16, a pair of reference holes 46 and 48 serving as non-through holes is spaced apart in a leftward-rightward direction and is formed at the same position in a forward-backward direction. The reference hole 46 on the right wall 12B side is formed in a substantially square shape in a bottom view, and the reference hole 48 on the left wall 12C side is formed in a substantially elliptical shape that is long in the leftward-rightward direction in the bottom view.

Then, in a case where the recording tape cartridge 10 is loaded into the drive device, a positioning member (not illustrated) provided in the drive device is inserted into each of the reference hole 46 and the reference hole 48. Accordingly, the forward-backward direction and leftward-rightward direction of the recording tape cartridge 10 (case 12) are positioned within the drive device.

Additionally, a circular reference surface 47 and an elliptical reference surface 49 that are mirror-finished are respectively formed around the reference hole 46 and the reference hole 48 in the bottom plate 16A. Also, a reference surface 66 and a reference surface 68 having a rectangular shape (an oblong shape in which the forward-backward direction is the longitudinal direction), which is mirror-finished, are respectively formed at rear end corners in the bottom plate 16A. In addition, the respective reference surfaces 47, 49, 66, and 68 are on the same plane.

In a case where the recording tape cartridge 10 is loaded into the drive device, positioning surfaces (not illustrated) provided in the drive device abut against the reference surface 47 and the reference surface 49, the reference surface 66, and the reference surface 68, respectively. Accordingly, a thickness direction (height direction) of the recording tape cartridge 10 (case 12) is positioned within the drive device.

A barcode printing system (hereinafter also referred to as a "printing system") 80 and a barcode printing method (hereinafter sometimes referred to as "printing method"), which directly print a one-dimensional barcode BC or the like (including a white base) in which individual identification information of the recording tape cartridge 10 is recorded on a label surface 70 formed on a rear wall 12D of the case 12 next in the recording tape cartridge 10 configured as described above, and the recording tape cartridge 10 on which the barcode BC or the like is printed (a method of manufacturing the recording tape cartridge 10 with a barcode) will be described in detail.

As illustrated in FIG. 1, a substantially oblong label surface 70 of which the leftward-rightward direction is the longitudinal direction is formed on the rear wall 12D of the case 12. The label surface 70 is constituted of a first half label surface 72 formed at an upper part (first peripheral wall 14B) of the rear wall 12D of the case 12, and a second half label surface 74 formed at a lower part (second peripheral wall 16B) of the rear wall 12D of the case 12.

The first half label surface 72 is constituted of a bottom surface of a substantially oblong first recess 14C formed in the first peripheral wall 14B, and the second half label surface 74 is constituted of a bottom surface of a substantially oblong second recess 16C formed in the second peripheral wall 16B. Additionally, the surface roughnesses (arithmetic average roughnesses) Ra of the first half label surface 72 and the second half label surface 74 are both 0.2 µm to 0.5 µm. That is, the first half label surface 72 and the second half label surface 74 are formed more smoothly than the other parts.

In addition, the surface roughnesses Ra of the first half label surface 72 and the second half label surface 74 can be set by appropriately adjusting the roughnesses of molding surfaces of molds (not illustrated) for molding the first half 14 and the second half 16 respectively. Then, as will be described below, the barcode BC is printed only on the second half label surface 74, and a numerical value NV as an example of the character code is printed only on the first half label surface 72.

Figure 3:
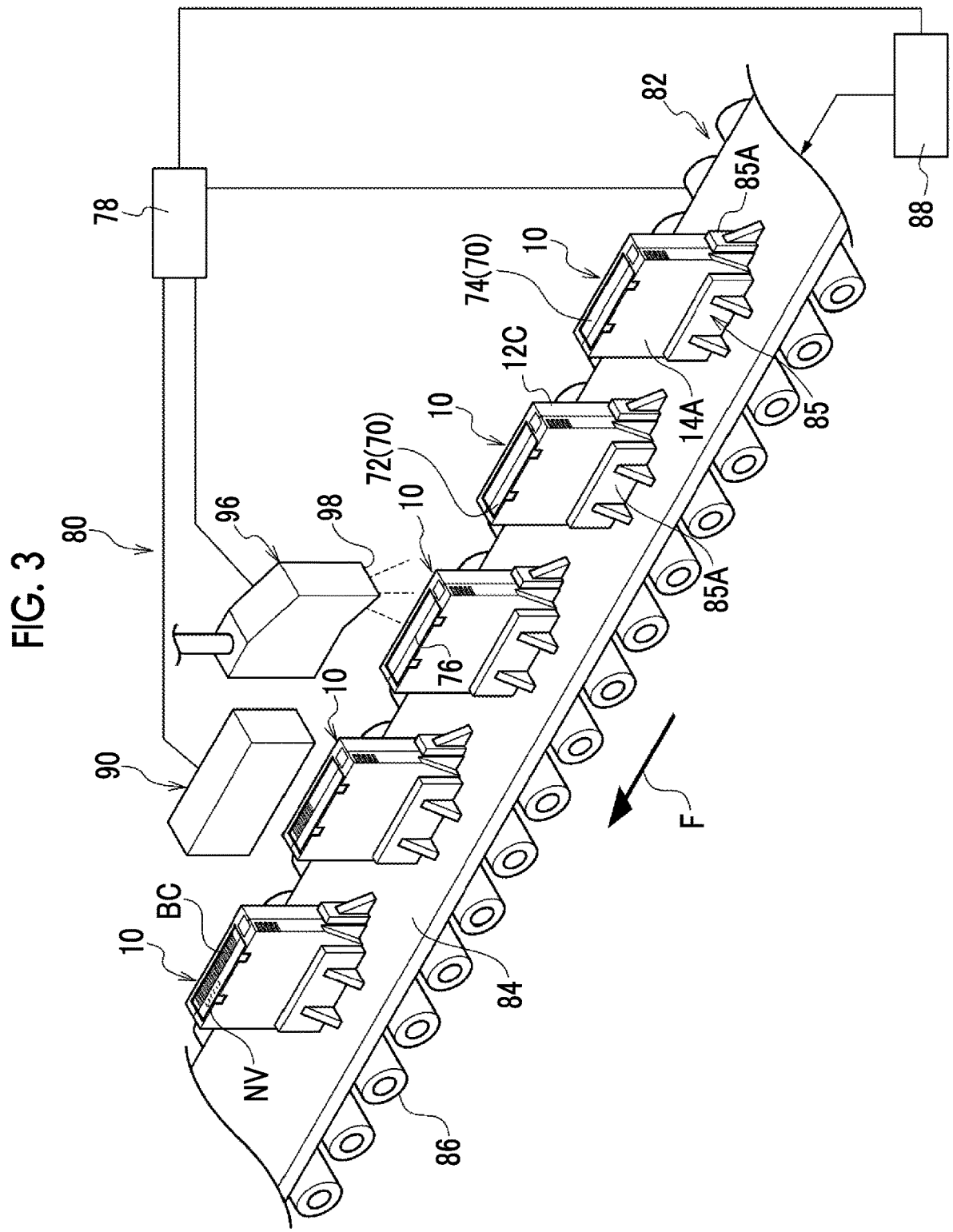
FIG. 3 is a configuration diagram illustrating a printing system that prints a barcode on a label surface of the recording tape cartridge according to the present embodiment.
Figure 4:
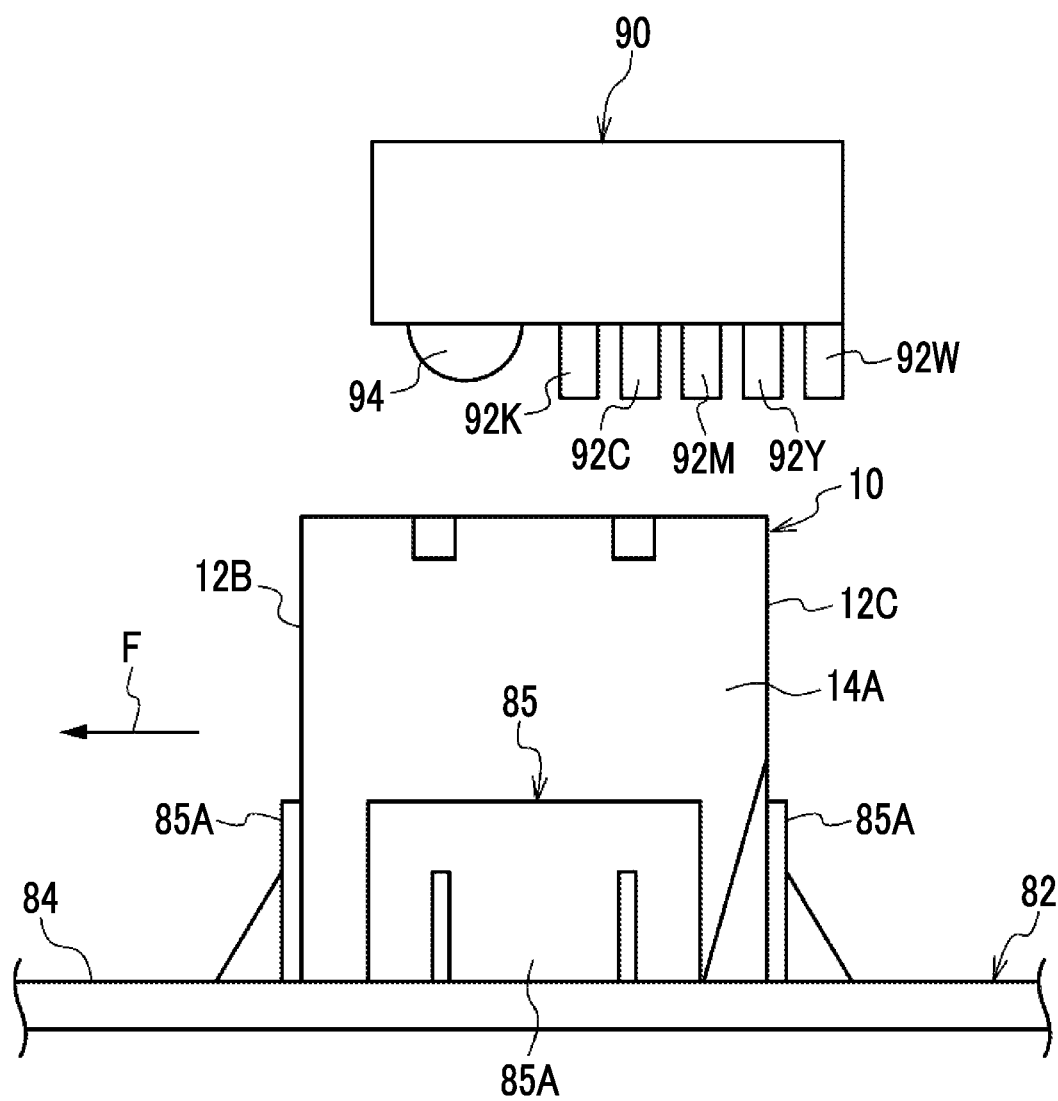
FIG. 4 is an enlarged view illustrating main parts of the printing system that prints a barcode on the label surface of the recording tape cartridge according to the present embodiment as viewed from a direction orthogonal to a conveying direction.
Figure 5:
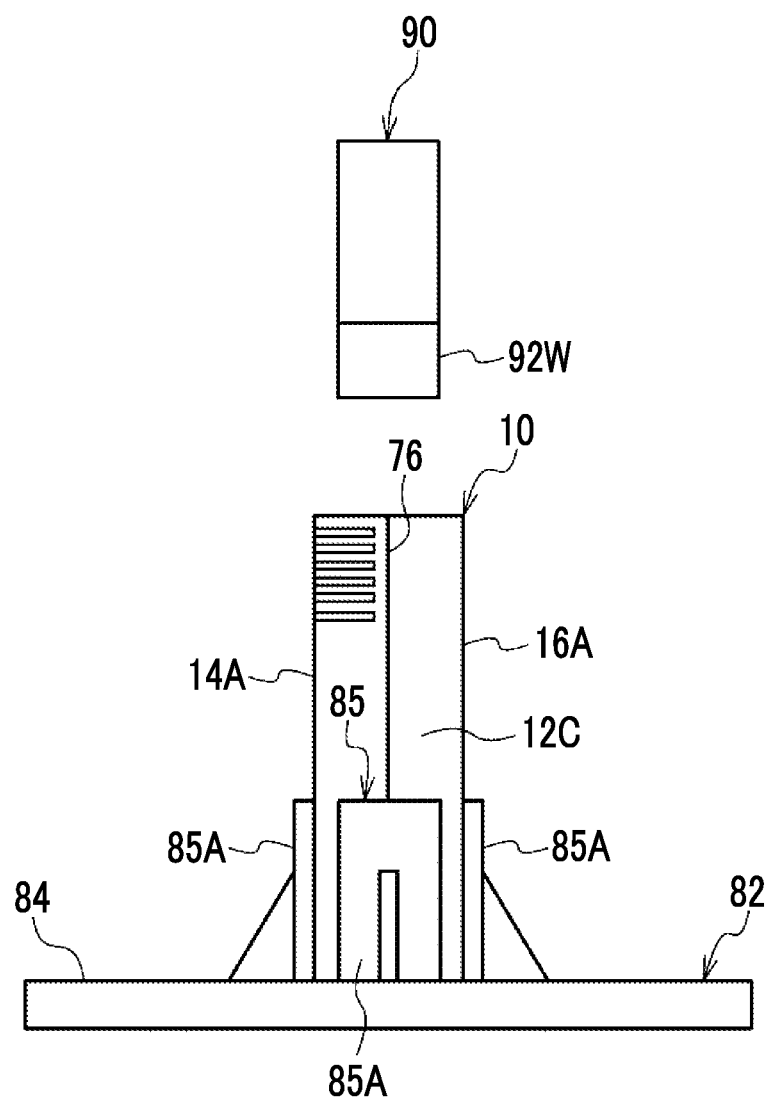
FIG. 5 is an enlarged view illustrating the main parts of the printing system that prints a barcode on the label surface of the recording tape cartridge according to the present embodiment as viewed from the conveying direction.

As illustrated in FIGS. 3 to 5, the printing system 80 includes a conveying unit 82 that conveys a plurality of recording tape cartridges 10 together, and a printing unit 90 that prints the barcode BC only on the second half label surface 74 in each recording tape cartridge 10 conveyed by the conveying unit 82 and prints the numerical value NV or the like only on the first half label surface 72.

Figure 6:
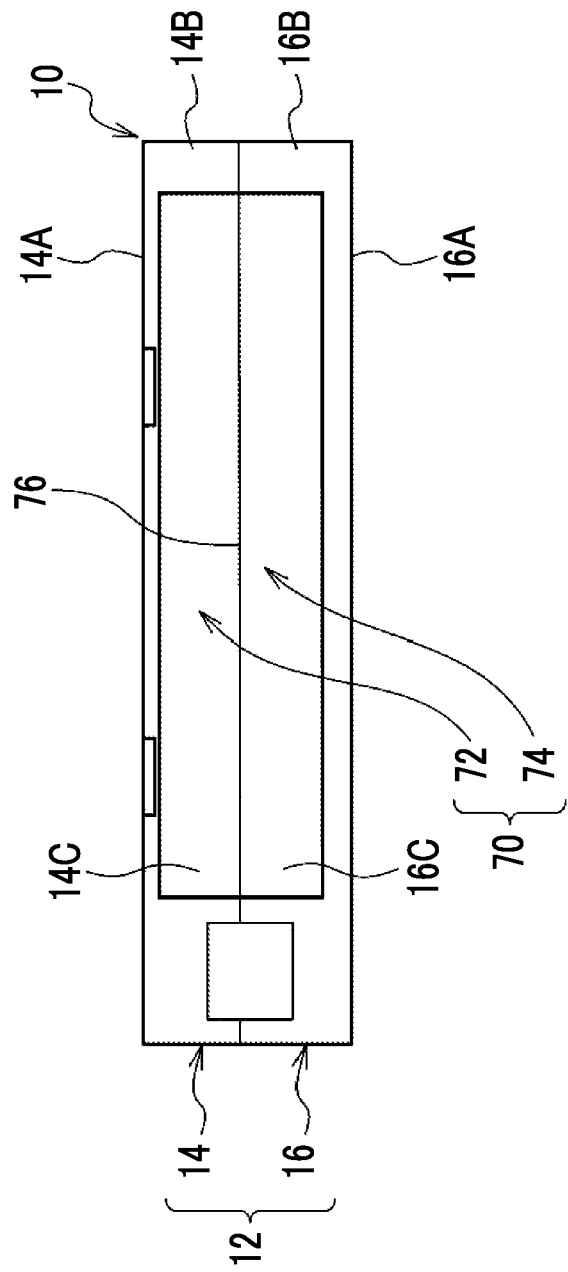
FIG. 6 is an enlarged view illustrating the label surface of the recording tape cartridge according to the present embodiment.

Then, the printing system 80 includes a detection unit 96 that detects a parting line 76 (refer to FIG. 6) formed on the label surface 70 as a boundary line between the first half label surface 72 and the second half label surface 74, an adjusting unit 88 that appropriately adjusts the position of the conveying unit 82 on the basis of the position of the parting line 76 detected by the detection unit 96, and a control unit 78 that controls the respective units.

The conveying unit 82 is configured to include an endless conveying belt 84 supported so as to move around in one direction (indicated by arrow F in FIGS. 3 and 4) on a stage 86 including a plurality of rollers. Then, a holding part 85 that holds a recording tape cartridge 10 is integrally provided on the conveying belt 84. More specifically, the holding part 85 is constituted of a plurality of tabular walls 85A that come into in contact with the top plate 14A, the bottom plate 16A, the right wall 12B, and the left wall 12C of the recording tape cartridge 10 to prevent the recording tape cartridge 10 from falling down.

Hence, the recording tape cartridge 10 is inserted from the front wall 12A side into a space surrounded by the plurality of walls 85A and is erected in a state where the front wall 12A is brought into contact with an upper surface of the conveying belt 84. Accordingly, the recording tape cartridge 10 is conveyed in a state where the label surface 70 faces upward.

As illustrated in FIGS. 4 and 5, the printing unit 90 includes a white ink jet recording head 92W serving as base printing means for printing a white base on the first half label surface 72 and the second half label surface 74 and a black ink jet recording head 92K serving as barcode printing means for printing a black barcode BC on the white base printed on the second half label surface 74.

Then, the printing unit 90 has yellow, magenta, cyan, and black ink jet recording heads 92Y, 92M, 92C, and 92K serving as character code printing means for printing the numerical value NV corresponding to the barcode BC together with a color-coded color base CF (refer to FIG. 1) on the white base printed on the first half label surface 72 on which the barcode BC is not printed.

In addition, the black ink jet recording head 92K serving as the character code printing means is also a black ink jet recording head 92K serving as the barcode printing means. Additionally, the ink jet recording heads 92W, 92Y, 92M, 92C, and 92K are arranged in this order from the upstream side in the conveying direction of the recording tape cartridge 10.

Additionally, as illustrated in FIG. 4, an ultraviolet (UV) lamp 94 that cures ultraviolet (UV) ink jetted from each of the ink jet recording heads 92W, 92Y, 92M, 92C, and 92K is provided on the downstream side in the conveying direction of the recording tape cartridge 10 in the printing unit 90 (downstream of the ink jet recording head 92K in the conveying direction). As the UV ink is cured by the UV lamp 94, the barcode BC or the like printed on the label surface 70 is fixed on the label surface 70.

In addition, the ink for printing the barcode BC or the like is preferably a low-gloss ink, and the UV ink is optimal. Additionally, the viscosity of the UV ink is preferably 0.2 Pa·s or more. Additionally, the timing for printing the barcode BC or the like on the label surface 70 is preferably the timing immediately before the recording tape cartridge 10 is shipped in order to flexibly correspond to the individual identification information desired by a user.

Additionally, as illustrated in FIG. 3, the detection unit 96 includes a known image sensor 98 and is disposed upstream of the printing unit 90 in the conveying direction of the recording tape cartridge 10. The control unit 78 controls the adjusting unit 88 on the basis of a detection result of the image sensor 98 so as to adjust that the position of the conveying unit 82 (the stage 86 and the conveying belt 84).

The adjusting unit 88 includes a known mechanism (a guide rail and a cylinder that are not illustrated) that supports the conveying unit 82 including the stage 86 and the conveying belt 84 so as to be movable in the horizontal direction and the vertical direction orthogonal to the conveying direction of the recording tape cartridge 10 with respect to the printing unit 90.

As the adjusting unit 88 is controlled by the control unit 78, the position of the label surface 70 (the second half label surface 74 and the first half label surface 72) of each recording tape cartridge 10 conveyed by the conveying belt 84 is adjusted by the ink jet recording heads 92W, 92Y, 92M, 92C, and 92K.

Next, the operation of the barcode printing system 80 according to the present embodiment configured as described above (including the barcode printing method and the method of manufacturing the recording tape cartridge 10 with a barcode by the barcode printing method) will be described.

Figure 7:
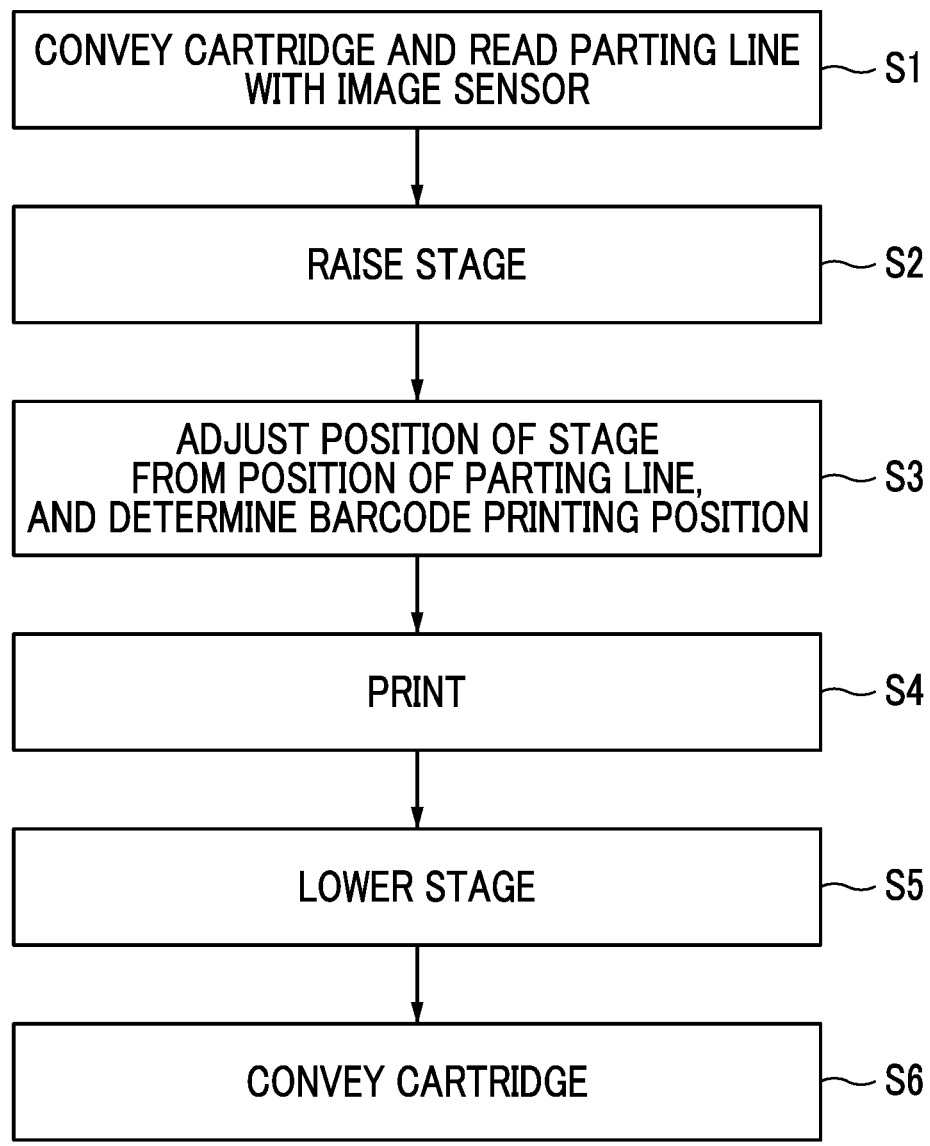
FIG. 7 is a flowchart illustrating the operation of the printing system that prints a barcode on the label surface of the recording tape cartridge according to the present embodiment.

As illustrated in FIG. 7, first, a plurality of (for example, five) recording tape cartridges 10 are conveyed in the conveying direction (direction of the arrow F) by the conveying belt 84 of the conveying unit 82. In this case, each recording tape cartridge 10 is held by the holding part 85 (the plurality of walls 85A) formed on the conveying belt 84 so as not to fall and is conveyed in a state where the label surface 70 faces upward.

Then, the position of the parting line 76 on the label surface 70 of the recording tape cartridge 10 conveyed first is detected by the detection unit 96 (image sensor 98) (detection step: Step S1). Then, the control unit 78 controls the adjusting unit 88 on the basis of the detection result.

That is, the conveying unit 82 (the stage 86 and the conveying belt 84) is raised as necessary (Step S2), and the conveying unit 82 is further moved in the horizontal direction orthogonal to the conveying direction of the recording tape cartridge 10 (Step S3). Accordingly, the position of the label surface 70 (the second half label surface 74 and the first half label surface 72) of the recording tape cartridge 10 to be conveyed is adjusted with respect to each of the ink jet recording heads 92W, 92Y, 92M, 92C, and 92K in the printing unit 90 (adjustment step).

In this way, in a case where the positions of the second half label surface 74 and the first half label surface 72 are adjusted with respect to the printing unit 90 (ink jet recording head 92), first, the white base is printed on the second half label surface 74 and the first half label surface 72 (base printing step) by the white ink jet recording head 92W.

Then, the barcode BC is printed on the white base printed on the second half label surface 74 by the black ink jet recording head 92K (barcode printing step: Step S4). In addition, the barcode BC printed on the second half label surface 74 is cured by the UV lamp 94.

Meanwhile, together with the printing of the barcode BC, the color-coded color base CF and the numerical value NV are printed on the white base printed on the first half label surface 72 by the yellow, magenta, cyan, and black ink jet recording heads 92Y, 92M, 92C, and 92K (character code printing step: Step S4). Then, the color base CF and the numerical value NV printed on the first half label surface 72 are cured by the UV lamp 94.

In this way, as the barcode BC and the numerical value NV are printed on the label surfaces 70 (the second half label surfaces 74 and the first half label surfaces 72) of all the recording tape cartridges 10, the control unit 78 controls the adjusting unit 88, and lowers the conveying unit 82 (the stage 86 and the conveying belt 84) as necessary (Step S5). Then, each recording tape cartridge 10 (recording tape cartridge 10 with a barcode) on which the barcode BC and the numerical value NV are printed on the label surface 70 is conveyed to the next step (Step S6).

As described above, the barcode BC and the numerical value NV are directly printed on the label surface 70 of the recording tape cartridge 10. Hence, as compared to a case where a barcode label (not illustrated) is manually attached to the label surface 70, the productivity of the recording tape cartridge 10 can be improved and the manufacturing cost can be reduced. Additionally, it is possible to prevent an error in attaching a barcode label to the label surface 70.

Moreover, since the barcode BC is not formed so as to straddle both the first half label surface 72 and the second half label surface 74 (beyond the parting line 76), a plurality of lines that constitute the barcode BC will not be cut or shifted in the middle. For this reason, it is possible to suppress or prevent the occurrence of poor reading of the barcode reader (not illustrated) with respect to the barcode BC.

Additionally, the surface roughness Ra of the label surface 70 (the second half label surface 74 and the first half label surface 72) is set to 0.2 μm to 0.5 μm. Hence, compared to a case where the surface roughness Ra of the label surface 70 is smaller than 0.2 μm and larger than 0.5 μm, the printed barcode BC or the like can be easily fixed, and it is possible to suppress or prevent the occurrence of poor reading due to blurring of the printed barcode BC or the like.

Additionally, since the barcode BC or the like is directly printed on the label surface 70, the barcode BC or the like can be reprinted as necessary. That is, the individual identification information of the recording tape cartridge 10 can be simply changed. Additionally, as long as at least the label surface 70 is formed in white in advance on the rear wall 12D of the case 12 by two-color molding or the like, a base printing step (including the white ink jet recording head 92W) of forming the white base can be omitted.

Figure 8:
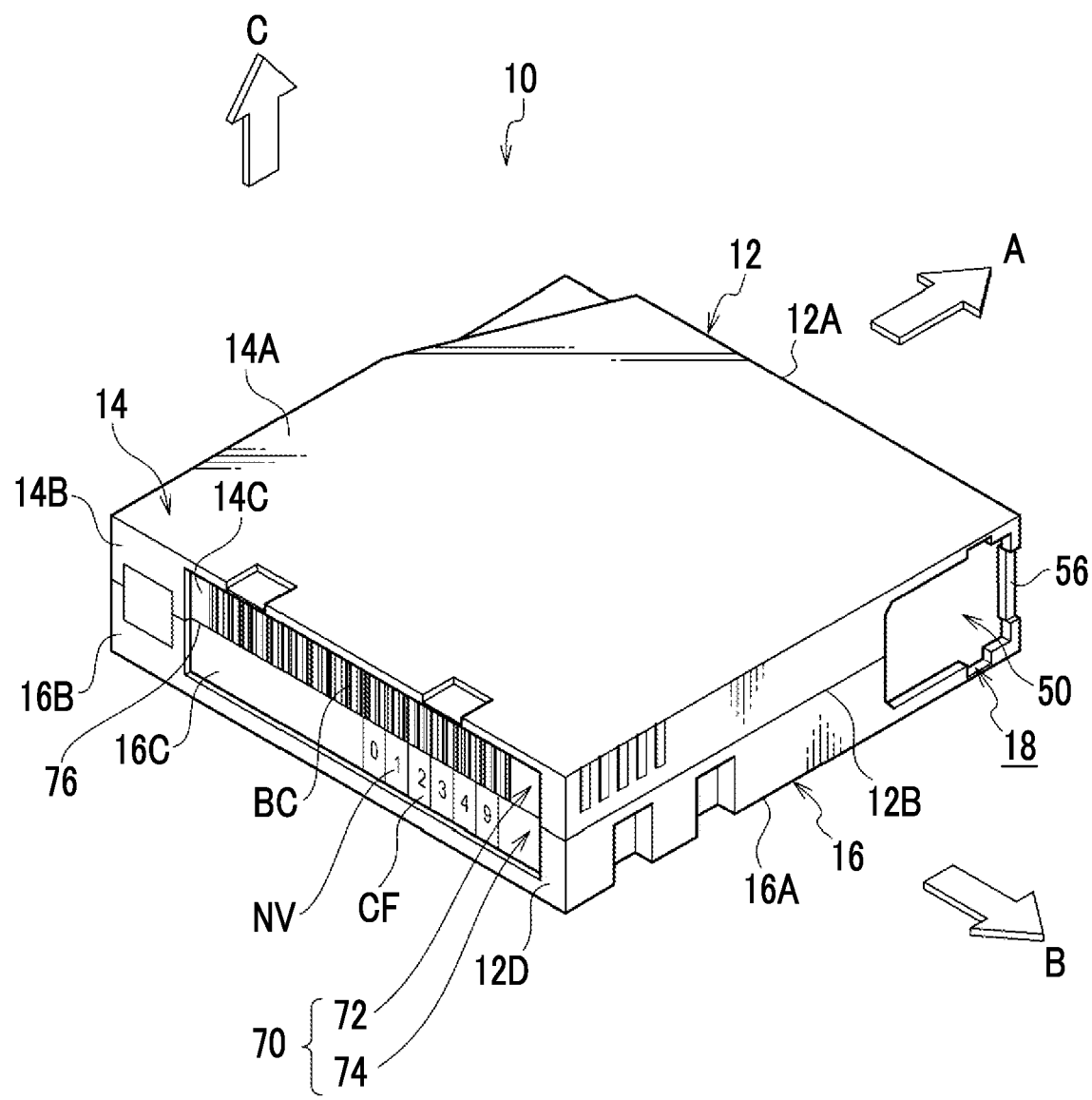
FIG. 8 is a perspective view illustrating a modification example of the recording tape cartridge according to the present embodiment as viewed from the rear.

Additionally, the positions of the barcode BC and the numerical value NV printed on the label surface 70 are not limited to those illustrated in FIG. 1. For example, as illustrated in FIG. 8, the barcode BC may be printed only on the first half label surface 72, and the numerical value NV corresponding to the barcode BC may be printed only on the second half label surface 74. In this way, according to the present embodiment, since the barcode BC or the like is directly printed on the label surface 70, the position of the barcode BC or the like can also be changed as necessary.

The recording tape cartridge 10, the barcode printing system 80, the barcode printing method, and the method of manufacturing the recording tape cartridge 10 with a barcode according to the present embodiment have been described with reference to the drawings. However, the present embodiment is not limited to the illustrated one, and can be appropriately changed in design without departing from the gist of the present disclosure.

For example, the barcode BC is not limited to the one-dimensional barcode BC and may be a two-dimensional barcode (not illustrated). Additionally, the barcode BC may be the same as, for example, the serial number of a memory board (not illustrated) provided within the case 12 or may indicate the generation of the recording tape cartridge 10.

Additionally, the character code is not limited to the numerical value NV and may be, for example, an alphabet or the like. Additionally, in a case where it is not necessary to print the character code, such as the numerical value NV, the white base may be printed only on the first half label surface 72 or the second half label surface 74 on which the barcode BC is printed.

Additionally, in a case where it is not necessary to print the numerical value NV on the color-coded color base CF, the printing unit 90 may not be provided with the yellow, magenta, and cyan ink jet recording heads 92Y, 92M, and 92C. Moreover, the UV lamp 94 may be provided between the white ink jet recording head 92W and the yellow ink jet recording head 92Y so as to cure the white base before the printing of the barcode BC or the like.

Additionally, the printing unit 90 may provide a first printing unit (not illustrated) including the white ink jet recording head 92W and the UV lamp 94 and a second printing unit (not illustrated) including the yellow, magenta, cyan, and black ink jet recording heads 92Y, 92M, 92C, 92K and the UV lamp 94 separately. Additionally, the ink jetted from each ink jet recording head 92 is optimally the UV ink but is not limited to the UV ink.

What is claimed is:

1. A recording tape cartridge comprising:
a case that includes a first half, in which a first peripheral wall is erected around a top plate, and a second half, in which a second peripheral wall is erected around a bottom plate, the first half and the second half being joined to each other in a state in which the first peripheral wall and the second peripheral wall abut against each other, the case storing a reel on which recording tape is wound; and
a label surface formed by a first half label surface of the first peripheral wall and a second half label surface of the second peripheral wall, on a side of the case opposite to a loading direction of the case with respect to a drive device,
wherein a one-dimensional or two-dimensional barcode, on which individual identification information is recorded, is directly printed only on the first half label surface or the second half label surface, and
wherein a parting line is formed on the label surface as a boundary line between the first half label surface and the second half label surface.

2. The recording tape cartridge according to claim 1, wherein a character code corresponding to the one-dimensional or the two-dimensional barcode is printed on the one of the first half label surface or the second half label surface, on which the one-dimensional or two-dimensional barcode is not printed.

3. The recording tape cartridge according to claim 1, wherein the first half label surface and the second half label surface have a surface roughness of 0.2 μm to 0.5 μm.

4. The recording tape cartridge according to claim 1, wherein at least the first half label surface or the second half label surface, before the one-dimensional or two-dimensional barcode is printed, are formed in white.

5. A barcode printing system comprising:
a conveying unit that conveys a recording tape cartridge including a case that has a first half, in which a first peripheral wall is erected around a top plate, and a second half, in which a second peripheral wall is erected around a bottom plate, the first half and the second half being joined to each other in a state in which the first peripheral wall and the second peripheral wall abut against each other, the case storing a reel on which recording tape is wound, and including a label surface formed by a first half label surface of the first peripheral wall and a second half label surface of the second peripheral wall on a side opposite to a loading direction of the case with respect to a drive device; and
a printing unit that prints a one-dimensional or two-dimensional barcode in which individual identification information is recorded only on the first half label surface or the second half label surface of the recording tape cartridge conveyed by the conveying unit.

6. The barcode printing system according to claim 5, further comprising:

a detection unit that detects a parting line formed on the label surface as a boundary line between the first half label surface and the second half label surface; and an adjusting unit that adjusts a position of the conveying unit on the basis of a position of the parting line detected by the detection unit.

7. The barcode printing system according to claim 5, wherein the printing unit has base printing means for printing a white base on at least one of the first half label surface or the second half label surface; and barcode printing means for printing a black one-dimensional or two-dimensional barcode on the base printed on the first half label surface or the second half label surface.

8. The barcode printing system according to claim 7, wherein the base printing means prints the white base on both the first half label surface and the second half label surface, and wherein the printing unit includes character code printing means for printing a character code corresponding to the one-dimensional or two-dimensional barcode on the base printed on the first half label surface or on the base printed on the second half label surface on which the one-dimensional or two-dimensional barcode is not printed.

9. The barcode printing system according to claim 5, wherein a parting line is formed on the label surface as a boundary line between the first half label surface and the second half label surface.

10. A barcode printing method comprising:

a base printing step of printing a white base on at least one of a first half label surface or a second half label surface, of a recording tape cartridge that includes a case that has a first half, in which a first peripheral wall is erected around a top plate, and a second half, in which a second peripheral wall is erected around a bottom plate, the first half and the second half being joined to each other in a state where the first peripheral wall and the second peripheral wall abut against each other, the case storing a reel on which recording tape is wound, and that includes a label surface formed by the first half label surface of the first peripheral wall and the second half label surface of the second peripheral wall on a side opposite to a loading direction of the case with respect to a drive device, the recording tape cartridge being conveyed by a conveying unit; and a barcode printing step of printing a one-dimensional or two-dimensional barcode in which individual identification information is recorded only on the base printed on the first half label surface or the base printed on the second half label surface.

11. The barcode printing method according to claim 10, further comprising:

a character code printing step of printing a character code corresponding to the one-dimensional or two-dimensional barcode on the base printed on the first half label surface or on the base printed on the second half label surface on which the one-dimensional or two-dimensional barcode is not printed.

12. The barcode printing method according to claim 10, further comprising:

a detection step of detecting a parting line formed on the label surface as a boundary line between the first half label surface and the second half label surface; and an adjustment step of adjusting a position of the conveying unit on the basis of a position of the parting line detected in the detection step.

13. A method of manufacturing a recording tape cartridge with a barcode, comprising:

printing a one-dimensional or two-dimensional barcode on a recording tape cartridge by the barcode printing method according to claim 10.

14. The barcode printing method according to claim 10, wherein a parting line is formed on the label surface as a boundary line between the first half label surface and the second half label surface.

\* \* \* \* \*